United States Patent [19]

Sena et al.

[11] Patent Number: 5,784,334

[45] Date of Patent: Jul. 21, 1998

[54] METHOD AND SYSTEM FOR DETECTING HYDROCARBON RESERVOIRS USING AMPLITUDE VERSUS OFFSET ANALYSIS OF SEISMIC SIGNALS

[75] Inventors: Arcangelo G. Sena, Plano; Herbert W. Swan, Richardson, both of Tex.

[73] Assignee: Atlantic Richfield Company, Los Angeles, Calif.

[21] Appl. No.: 614,744

[22] Filed: Mar. 13, 1996

[51] Int. Cl.$^6$ .............................. G01V 1/30; G01V 1/28
[52] U.S. Cl. ............................ 367/47; 367/38; 364/421
[58] Field of Search ........................... 367/38, 47, 59; 364/421

[56] References Cited

U.S. PATENT DOCUMENTS

| | | | |
|---|---|---|---|
| 4,995,007 | 2/1991 | Corcoran et al. | 367/52 |
| 5,258,960 | 11/1993 | Swan | 367/38 |
| 5,440,525 | 8/1995 | Dey-Sarkar et al. | 367/47 |
| 5,515,335 | 5/1996 | Swan | 367/47 |

OTHER PUBLICATIONS

Swan, "Properties of direct AVO hydrocarbon indicators", *Offset-dependent reflectivity—Theory and Practice of AVO Analysis* (Castagna, J.P. & Backus, M.M., eds., Soc. Expl. Geophys., 1993), pp. 78–92.

Taner, et al., "Complex Seismic Trace Analysis", *Geophysics*, vol. 44, No. 6 (Jun., 1979), pp. 1041–1063.

Castagna et al., "Comparison of AVO indicators: A modeling study", Geophysics, vol. 59, No. 12, pp. 1849–1855, Dec. 1994.

*Primary Examiner*—Ian J. Lobo
*Attorney, Agent, or Firm*—Anderson, Levine & Lintel

[57] ABSTRACT

A computer-operated method for analyzing seismic data to discern the presence of hydrocarbon-bearing formations is disclosed. According to the disclosed method and system, amplitude-versus-offset (AVO) analysis is performed to assign, for each depth point in a survey region, an AVO intercept value and an AVO gradient value; the AVO intercept value corresponds to the zero-offset response for acoustic reflections from the depth point, while the AVO gradient value corresponds to the rate of change of the amplitude as a function of the angle of incidence of the acoustic energy (typically, with the square of the sine of the angle). An AVO indicator indicative of the presence of hydrocarbons at a subsurface stratum is derived to correspond to the rate of change of the product of the AVO intercept value and the AVO gradient value for the depth point under analysis, along the direction of a deviation vector of the AVO intercept value and the AVO gradient value from a background trend for depth points surrounding the depth point under analysis in time and space. The background trend, and thus the deviations, may be a straight line in a space having AVO intercept value and AVO gradient value as axes, or may be a statistical trend used in deriving the deviations. Use of the disclosed method and system has been observed to indicate deep hydrocarbon-bearing formations that are not detectable using conventional AVO analysis.

19 Claims, 10 Drawing Sheets

METHOD AND SYSTEM FOR DETECTING HYDROCARBON RESERVOIRS USING AMPLITUDE VERSUS OFFSET ANALYSIS OF SEISMIC SIGNALS

This invention is in the field of seismic prospecting for oil and gas reservoirs, and is more specifically directed to the analysis of seismic signals indicative of subsurface geological interfaces and structures.

BACKGROUND OF THE INVENTION

The use of seismic surveys is now fundamental in the search for oil and gas reservoirs in the earth. As is rudimentary in the art, seismic surveys are performed by imparting acoustic energy of a known amplitude and frequency pattern at one or more locations of the earth (either at a land surface or in a marine environment), and then detecting reflected and refracted acoustic energy at other locations. The delay time between the imparting of the acoustic energy at the source location and detection of the same wave at a receiver location is indicative of the depth at which a particular reflecting geological interface is located. The field of seismic data analysis is concerned with techniques for analyzing the detected acoustic energy to determine both the location and also the properties of various geological strata.

A known technique in the generation and analysis of conventional seismic surveys is referred to as amplitude-versus-offset ("AVO") analysis. According to the AVO approach, attributes of a subsurface interface are determined both from the normal-incidence amplitude of seismic energy and also from the dependence of the detected seismic reflections on the angle of incidence of the energy. According to conventional AVO analysis, multiple seismic traces (i.e., time-domain signals at different detection locations) that include a signal from a common reflection point are collected; such a group of traces is commonly referred to as a common-depth point (CDP) gather. Typically, a series of common reflection points for the same source-receiver pairs underlie the same surface location at the midpoint between the source and receiver for multiple offsets; as such, this gather is also often referred to as a common midpoint (CMP) gather.

From the CDP (or CMP) gather, one may derive the amplitude R of a reflected seismic wave from an interface (i.e., the "target horizon") as a function of the angle of incidence O from the normal according to the following relationship:

$$R(\theta) = A + B\sin^2\theta$$

In this case, the coefficient A is the zero-offset response (also referred to as the AVO intercept), while the coefficient B is referred to as the AVO slope or gradient as it is representative of the rate of change of amplitude with the square of the angle of incidence.

For a given reflection event from a horizon between two geological formations, the values of A and B will depend upon the physical properties of the two formations. The well-known Zoeppritz equations provide closed form equations for $R(\theta)$ based upon the compressional velocities ($V_p$), shear velocities ($V_s$), and densities ($\rho$) of the two formations at the reflecting interface. However, inversion of the Zoeppritz equations to solve for the elastic properties of the formations from reflection data is impractical, due to numerical complexity.

By way of further background, the calculation of theoretical values for A and B for isolated rock interfaces (i.e., at specific horizons) through the use of the linearized Zoeppritz equations and based upon typical values for compressional velocity, density and Poisson's ratio for the strata on either side of the interface of interest, is described in Swan, "Properties of direct AVO hydrocarbon indicators", Offset-dependent reflectivity—Theory and Practice of AVO analysis(Castagna, J. P. & Backus, M. M., eds., Soc. Expl. Geophys., 1993), pp. 78–92. As described therein, variations in the A and B values for particular interfaces from a theoretical A-versus-B trend line for the expected stratigraphic sequences can indicate the location of interfaces in the survey.

Typically, AVO seismic data analysis is performed through the derivation of so-called "indicators" from the A and B coefficients for reflection depth points in the survey. A common AVO indicator is the product of the AVO intercept value A with the complex conjugate of the AVO slope B, both values being in their analytical, or complex, form. This indicator function is generally expressed as the function f(A,B)=AB*, from which the real, phase-independent, product indicator $\Re e\{AB^*\}$ is plotted for use by the analyst, as described in the Swan article referred to hereinabove. Typically, this real component of the complex indicator function is plotted as a function of time in similar fashion as raw or stacked seismic traces, with each indicator trace associated with a surface location. Variations in the amplitude of this indicator over time can identify the location of geological interfaces, particularly those which correspond to formations potentially bearing oil and gas in producible quantities.

For example, conventional AVO seismic analysis begins with the acquisition of data for a two-dimensional or three-dimensional survey in the usual manner. Conventional seismic data processing is then performed, including such operations as multiple elimination, filtering, prestack migration (i.e., time-domain to depth transformation) and normal move-out (NMO) correction, followed by grouping the signals into CDP gathers. Conventional AVO analysis then performs a regression of the seismic signals in each gather to derive the A and B coefficient values at each depth point, typically through a least-squares fit of the seismic data versus the squared sine of the angle of incidence. Once the A and B coefficient values are determined for each depth in the survey area, indicators such as the product AB* may be plotted as a survey section over surface location and time (i.e., in CMP-time space), similarly as seismic survey sections of other types.

Certain indicators are known as reliable in identifying the location of potential oil and gas reservoirs. For example, the product AB* is known to indicate the presence of hydrocarbon bearing sands of the so-called "Class 3" type. Class 3 sands are relatively shallow formations, and have an acoustic impedance that is less than the acoustic impedance of a neighboring shale, which results in interfaces therebetween for which the A and B coefficients in AVO analysis are both strongly negative; the product AB* at such interfaces is thus a positive value of detectable amplitude, and is a reliable indicator of the presence of the Class 3 sand.

However, it has been observed in connection with the present invention that deeper hydrocarbon reservoirs, such as Class 2 and Class 1 sands, are not readily detectable through use of the product AB indicator. Especially considering that most large and shallow reservoirs around the world have already been identified and exploited, such that modern exploration techniques must be concentrated on the detection and identification of deeper and often smaller reservoirs, the usefulness of the simple AB indicator is quite limited.

By way of further background, U.S. Pat. No. 5,661,617, filed Dec. 18, 1995, entitled "Method and Apparatus for Detection of Sand Formations in Amplitude-Versus-Offset Seismic Surveys", assigned to Atlantic Richfield Company and incorporated herein by this reference, describes a new AVO indicator for common depth points based upon the value of the AVO intercept A and the deviation of the AVO gradient B from a trend line. The indicator described in this application has been found useful for distinguishing hydrocarbon sands from surrounding formations.

It is therefore an object of the present invention to provide a method and system for identifying deep hydrocarbon formations from seismic data.

It is a further object of the present invention to provide such a method and system that provides indication of the presence of hydrocarbon reservoirs in survey regions where the properties of the underlying rock are relatively unknown.

It is a further object of the present invention to provide such a method and system that is compatible with seismic data from previously obtained surveys.

It is a further object of the present invention to provide such a method and system that is compatible with previous AVO analysis techniques.

It is a further object of the present invention to provide such a method and system that is substantially phase independent.

Other objects and advantages of the present invention will be apparent to those of ordinary skill in the art having reference to the following specification together with its drawings.

SUMMARY OF THE INVENTION

The invention may be implemented in a computer system and method of operating the same capable of performing amplitude-versus-offset (AVO) analysis. Conventional seismic data processing is performed according to the present invention, up to and including the generation of common depth-point (CDP) gathers of the seismic data. AVO analysis is then performed, preferably by way of a least-squares fit of the data versus the squared sine of the angle of incidence, generating an AVO intercept value A and an AVO gradient value B for each depth point. Statistics of the variations of A and B as a function of position and time (i.e., depth) are then generated, from which deviations $\Delta A$, $\Delta B$ may be derived for each point in the survey. A new AVO indicator is defined as $\Delta(AB^*)$, which is the rate of change of the product $AB^*$ along the direction of the deviation vector ($\Delta A$, $\Delta B$) from the background trend of the A and B coefficients in the A—B plane. This new indicator is a positive value for any point away from the statistical background, and is substantially phase independent.

Plotting of the indicator $\Delta(AB^*)$ as a function of location and time (or depth) over the survey area provides a survey in which deep hydrocarbon-bearing formations, such as Class 2 and Class 1 sands, may be readily identified. Information regarding actual properties of the rock are not required to identify these formations. As a result, the method and system according to the present invention is a direct hydrocarbon indicator based solely upon seismic data, providing the analyst with great insight into the commercial viability of hydrocarbon production without requiring core samples or actual drilling.

DETAILED DESCRIPTION OF THE PREFERRED EMBODIMENT

Figure 1:
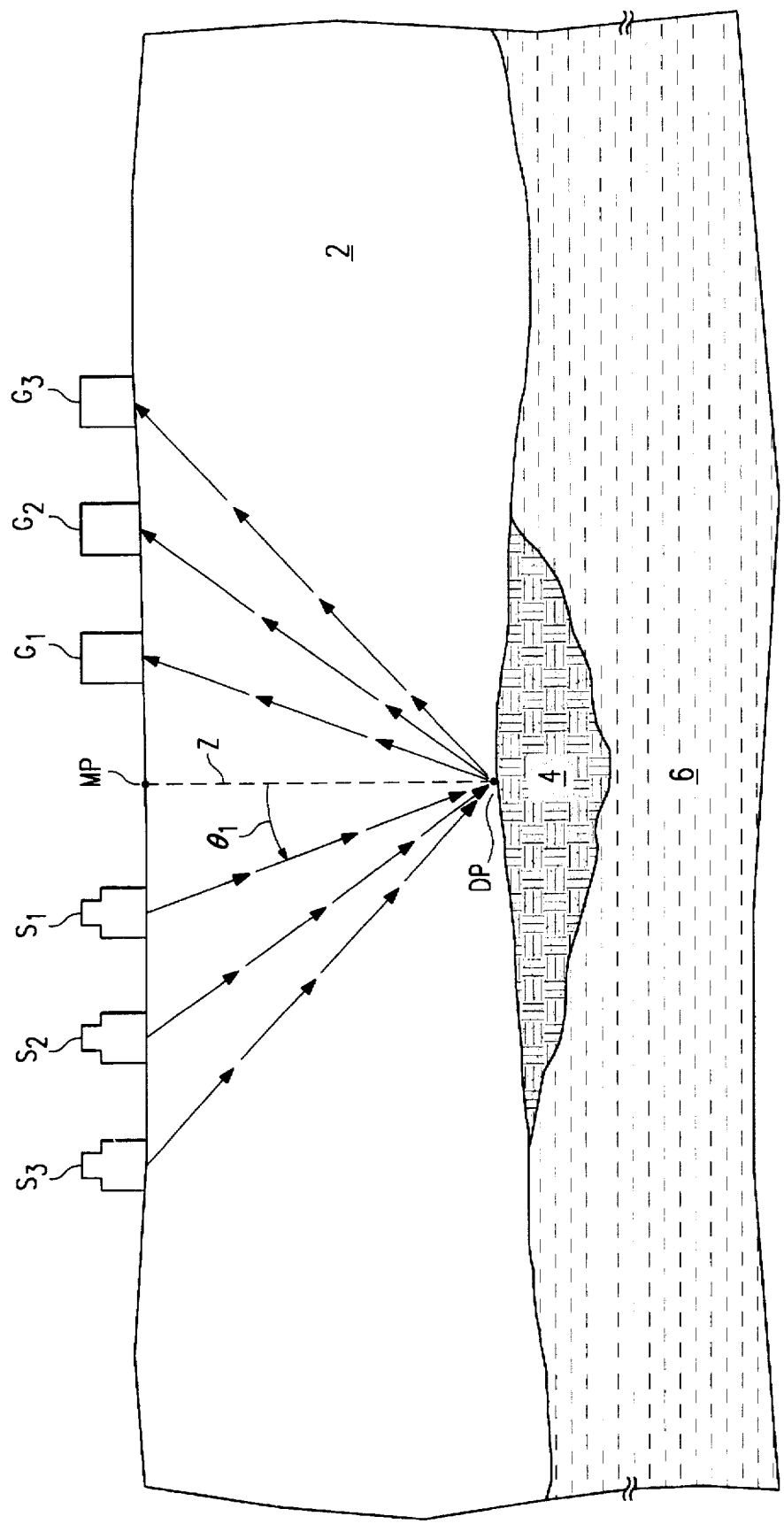
FIG. 1 is a cross-sectional view of a portion of the earth illustrating a single depth point in a seismic survey from which multiple seismic waves are reflected.

Referring first to FIG. 1, a seismic survey with which the preferred embodiment of the invention is useful will first be described, relative to a land-based survey containing a single depth point DP at a horizon between formations 2,4. While the survey of FIG. 1 is a land-based survey, it will of course be appreciated that the present invention is also applicable to marine surveys. Of course, the example of FIG. 1 will provide seismic signals for a multitude of depth points DP from which a seismic survey of either the two-dimensional or three-dimensional (2-D or 3-D) type may be generated. In the example of FIG. 1, depth point DP corresponds to the top surface of sand formation 4.

As is evident from FIG. 1, depth point DP in a seismic survey will reflect seismic energy from multiple source locations and detected by multiple receivers, such that the reflections travel from along multiple paths in the earth at varying angles of incidence. A zero-offset reflection is indicated by path Z between depth point DP and surface location MP that is directly above depth point DP. Seismic energy imparted by source $S_1$ is reflected from depth point DP and detected by geophone $G_1$; the angle of incidence $\theta_1$ is the angle of the path of energy from source $S_1$ from the vertical (i.e., from the zero-offset path). Similarly, energy imparted by sources $S_2$, $S_3$ is reflected from depth point DP and detected by geophones $G_2$, $G_3$, at increasing angles of incidence $\theta$ from the normal. Typically, the amplitude of the imparted seismic energy will vary with variations in the angle of incidence $\theta$. The variation in the amplitude of the energy with the angle of incidence $\theta$ is the basis of amplitude-versus-offset (AVO) seismic analysis techniques.

According to conventional AVO analysis, the relative amplitude of the reflected energy to the imparted energy as detected at the various geophone locations and extrapolated therefrom to zero offset (i.e., estimating the energy that would travel along vertical path Z from depth point DP to surface location MP) is referred to as the AVO intercept A for depth point DP. The AVO intercept value A may be either positive or negative, and will be between −1 and 1. For typical real geological interfaces and at relatively small angles, the amplitude of reflected to imparted energy will vary with approximately the sine squared of the angle θ in a linear fashion (i.e., with a constant slope, referred to as the AVO slope B). As such, in conventional AVO analysis, depth point DP, which underlies a specific midpoint and is at a specific depth, will have a single A value and a single B value, according to the relationship:

$$R(\theta)=A+B\sin^2\theta$$

Alternative models used in conventional AVO analysis may be used in connection with the present invention. For example, the reflected energy may be expressed as the following:

$$R(\theta)=A\cos^2\theta+B\sin^2\theta$$

In either case, the first and second coefficient values A, B, respectively, for depth point DP at the interface shown in FIG. 1, will depend upon the relative elastic properties of formations 2,4. According to the preferred embodiment of the invention, the model $R(\theta)=A+B\sin^2\theta$ is used in the automated generation of a new AVO indicator as will be described hereinbelow.

Figure 2:
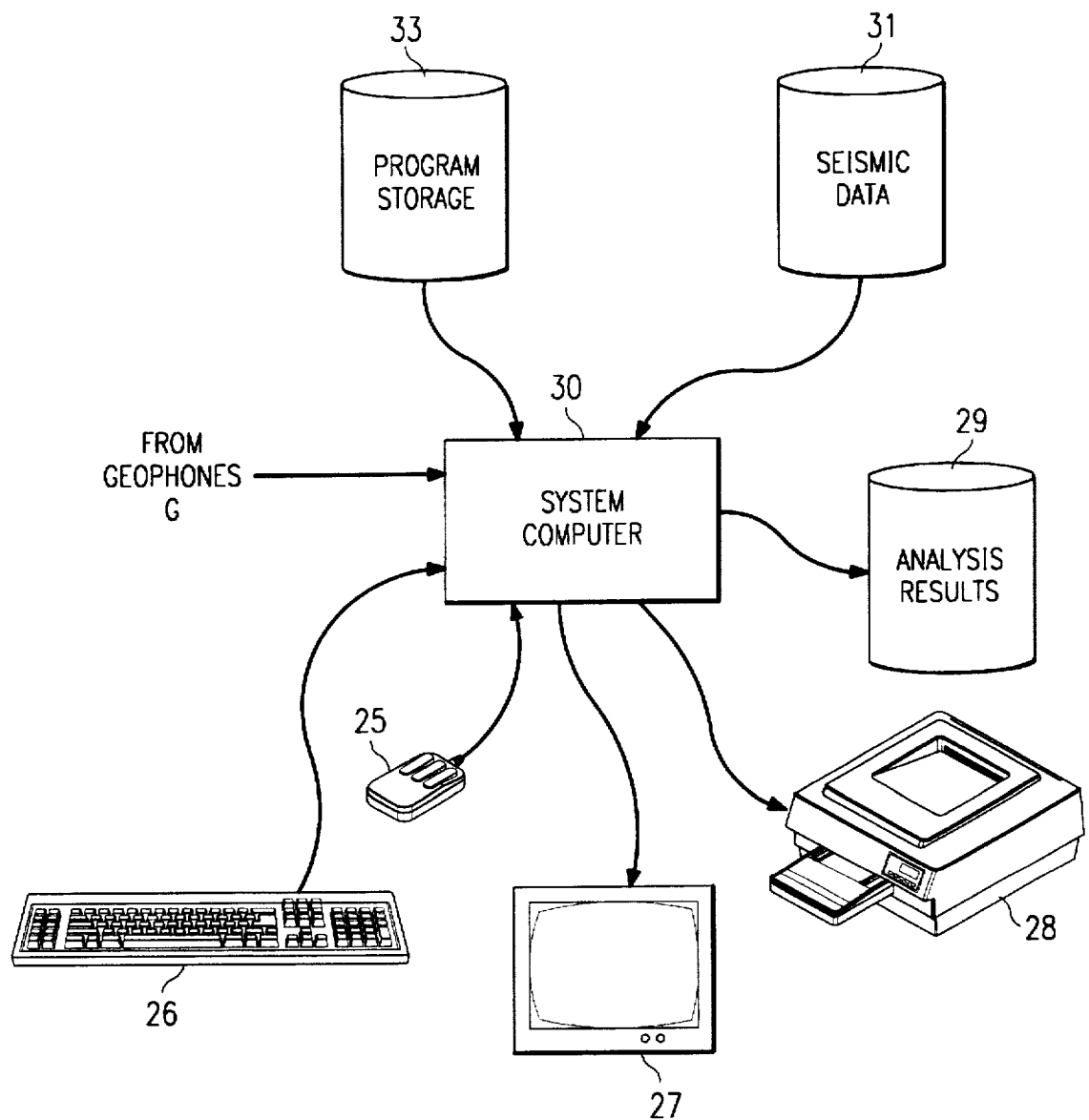
FIG. 2 is an electrical diagram, in block form, of a computer system for performing the preferred embodiment of the invention.

Referring now to FIG. 2, a computer system into which the preferred embodiment of the invention may be implemented, will be described. This system includes system computer 30, which may be implemented as any conventional personal computer or workstation, preferably a UND(based workstation such as a SPARC™ station available from Sun Microsystems, Inc., implemented either in standalone fashion, or as part of a network arrangement. System computer 30 is in communication with disk storage devices 29, 31, and 33, which are preferably external hard disk storage devices in a network. It is contemplated that disk storage devices 29, 31, 33 are conventional hard disk drives, and as such will be implemented by way of a local area network or by remote access. Of course, while disk storage devices 29, 31, 33, are illustrated as separate devices, a single disk storage device may of course be used to store any and all of the program instructions, measurement data, and results as desired.

In this embodiment of the invention, seismic data from geophones G is stored on disk storage device 31, from which system computer 30 may retrieve the appropriate data to perform the analysis described hereinbelow, according to program instructions that correspond to the method described hereinbelow. For operation on system computer 30, the program instructions are written in the form of a computer program (e.g., in the C++ language or any other suitable language) stored in computer-readable memory, such as program disk storage device 33 of FIG. 2; of course, the memory medium storing the computer program may be of any conventional type used for the storage of computer programs, including hard disk drives, floppy disks, CD-ROM disks, magnetic tape, and the like.

According to the preferred embodiment of the invention, system computer 30 presents output primarily onto graphics display 27, or alternatively via printer 28; further in the alternative, system computer 30 may store the results of the analysis described hereinbelow on disk storage 29, for later use and further analysis. Keyboard 26 and pointing device (e.g., a mouse, trackball, or the like) 25 are provided with system computer 30 to enable interactive operation. As noted, system computer 30 is able to communicate with disk storage devices 29, 31, including external hard disk storage on a network and floppy disk drives. System computer 30 may either be located at a data center remote from the survey region, or alternatively may be located on site at the seismic survey to provide real-time analysis of the seismic survey as it is being taken.

In the example of a land-based survey, as shown in FIG. 1, system computer 30 is in communication with geophones G (either directly or via a recording unit, not shown), to receive signals indicative of the reflected seismic energy received thereat in the survey. These signals, after conventional formatting and other initial processing, are stored by system computer as digital data in disk storage 31 for subsequent retrieval and processing in the manner described hereinbelow. While FIG. 2 illustrates disk storage 31 as directly connected to system computer 30, it is also contemplated that disk storage device 31 may be accessible through a local area network or by remote access. Furthermore, while disk storage devices 29, 31 are illustrated as separate devices for storing input seismic data and analysis results, respectively, disk storage devices 29, 31 may of course be implemented within a single disk drive (either together with or separately from program disk storage device 33), or in any other conventional manner as will be fully understood by one of skill in the art having reference to this specification.

Figure 3:
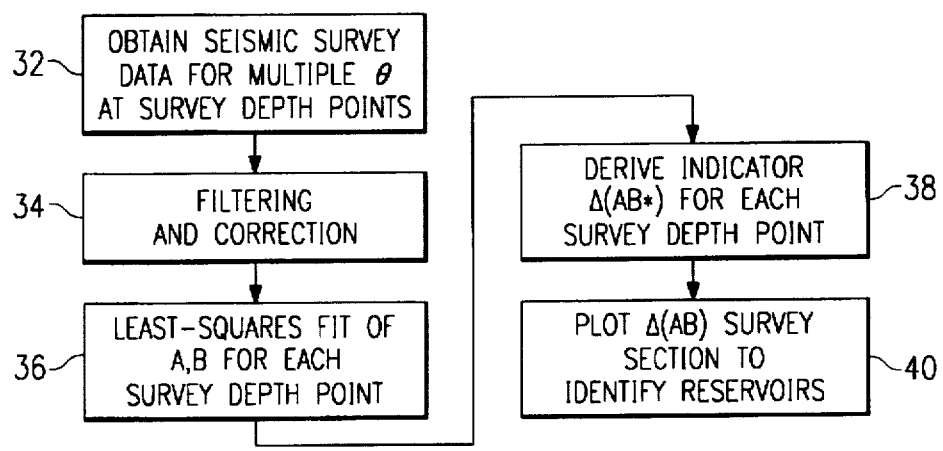
FIG. 3 is a flow chart illustrating the process of analyzing seismic data according to the preferred embodiment of the invention.

Referring now to FIG. 3, a method of analyzing the seismic signals detected by a plurality of seismic receivers, in order to discern the presence and location of potentially hydrocarbon bearing formations in the earth according to the preferred embodiment of the present invention, will now be described. The method of FIG. 3 may be implemented into and performed by the computer system of FIG. 2, and also by computers of other conventional architecture.

The method of the preferred embodiment of the invention begins, in process 32, with the obtaining of seismic data for a survey region. For example, process 32 may be performed by a conventional seismic survey over the region of interest, so long as each depth point of interest in the survey has seismic data corresponding to multiple offsets and thus multiple angles of incidence. The maximum angle of incidence that will provide useful data for the preferred embodiment of the invention is contemplated to be around 40° from the normal, and the dominant frequency of the seismic energy should be at least about 25 Hz to provide useful seismic resolution. The seismic data obtained in process 32 preferably has all shot and receiver gathers cross-correlated with one another, such that a consistent statics solution may be obtained. The seismic data obtained in process 32 may come from either a newly performed survey or, alternatively, may use data from existing surveys that meet the above requirements. Referring to FIG. 3, system computer 30 completes process 32 by storing the obtained seismic data in disk storage 31 for later retrieval.

Process 34 is next performed, in which system computer 30 performs conventional filtering and correction processing upon the seismic data stored in disk storage 31. The filtering and correction performed by process 34 includes the application of multiple elimination, statics corrections, prestack migration, normal move-out (NMO) correction, and the desired filtering of the seismic signals. For example, ground roll filtering may be performed in process by way of a conventional 3D fan filter that preferably takes into account the irregular 3D geometry with which the seismic data are collected. The correction and filtering of process 34 are readily performed by system computer 30 according to conventional digital processing and filtering techniques.

Following process 34, the method continues with process 36, which generates AVO coefficients A and B for each depth point in the survey. Process 36 is preferably performed by system computer 30 according to this embodiment of the invention, for each of many depth points below each survey surface location, using a least-squares fit of the amplitude of the seismic traces corresponding to that depth to derive an AVO intercept value A and an AVO gradient value B for the particular depth point. According to this preferred embodiment of the invention, process 36 is performed by retrieving a CDP gather $G_i$ of seismic traces of varying offset. The traces in the retrieved gather $G_i$ will thus have seismic signals corresponding to the reflection of acoustic energy from depth point $DP_j$ at multiple angles of incidence $\theta$ (as well as for other depth points underlying the same midpoint surface location). System computer 30 then performs regression upon the traces in gather $G_i$ to provide a least-squares fit of A and B at the two-way time $t_j$ corresponding to depth point $DP_j$. In effect, process 36 effectively "stacks" the records from the multiple offsets to form a composite record reflected in the values of the A and B coefficients.

Varying AVO models may be used in the least-squares regression. Typically, AVO analysis is done using the conventional two-term model:

$$R(\theta) = A + B \sin^2 \theta$$

Alternatively, other conventional or alternative models used in amplitude-versus-offset analysis, such as the two-term model $R(\theta) = A\cos^2\theta + B\sin^2\theta$, may be used in connection with, and benefit from, the present invention; in the case of the $R(\theta) = A\cos^2\theta + B\sin^2\theta$ model, the first and second coefficients A and B would be estimated in process 36 for each depth point $DP_j$ in the survey. Further in the alternative, regression according to another AVO model that includes a third term, $C(t_j)\sin^2\theta\tan^2\theta$, may be used, as described in the above-referenced U.S. Pat. No. 5,661,617. Use of this third term, and thus solution for the coefficient C, has been observed to improve the accuracy of the estimated AVO slope B to the true defined AVO gradient B, as compared to the simpler two-term model. Other processing, such as offset-dependent tuning may also be performed at this time.

Process 36 is then repeated for each depth point under each surface location in the survey area, based on the multiple-offset data provided therefor. As a result of process 36, each depth point in the survey is associated with an AVO intercept value A and an AVO slope, or gradient, value B, thus providing survey sections of both the AVO intercept value A and the AVO gradient value B. These A and B values will typically be complex numbers, to convey phase information regarding the reflections. If desired, a set of traces or data points of the AVO coefficients A and B (typically the real components thereof) may be generated, and displayed in a coordinate system having surface location and time axes (i.e., in CMP-time space).

If desired, corrections to the A and B survey sections derived in process 36 may now be performed. For example, as described in U.S. Pat. No. 5,258,960, issued Nov. 2, 1993, assigned to Atlantic Richfield Company and incorporated herein by this reference, conventional NMO corrections introduce a predictable error in the AVO slope values B, due to the well-known NMO "stretch" effects on seismic response with increasing offset. The predictable nature of the error in AVO slope values due to NMO stretch are thus removed in process 57, preferably in the manner described in the above-incorporated U.S. Pat. No. 5,258,960.

Alternatively, filtering may performed according to the technique described in U.S. Pat. No. 4,995,007, incorporated herein by this reference.

Following least-squares fit process 36 and such additional filtering and correction to the A, B sections as desired, process 38 is performed to derive, for each depth point, a value of an indicator $\Delta(AB^*)$ according to the preferred embodiment of the invention. As will become apparent from the following description, the indicator $\Delta(AB^*)$ has important properties that greatly improve the detection of possible hydrocarbon reservoirs, particularly at much deeper depths than may be detected according to conventional AVO analysis.

To provide further clarity in the description, the theoretical basis for the derivation of this new indicator $\Delta(AB^*)$ will now be provided.

As is known in the art, for example as described in Swan, "Properties of direct AVO hydrocarbon indicators", Offset-dependent reflectivity—Theory and Practice of AVO analysis (Castagna, J. P. & Backus, M. M., eds., Soc. Expl. Geophys., 1993), pp. 78–92, incorporated herein by this reference, the product of the AVO intercept value A with the amplitude of the complex conjugate of the AVO slope B in its analytical, or complex, form is a conventional AVO indicator. As described in copending application Ser. No. 08/107,091, filed Aug. 16, 1993, assigned to Atlantic Richfield Company and incorporated herein by this reference, analytical traces $A_a(t)$, $B_a(t)$ are generated for each surface location, and used in AVO analysis by adding the real trace (A(t), B(t), respectively) to the square root of −1 times the Hilbert transform of the trace. The generation of analytic traces $A_a(t)$, $B_a(t)$ is based upon the representation of seismic traces as the real part of the analytical or complex traces, as described in Taner, et al., "Complex Seismic Trace Analysis", Geophysics, Vol. 44, No. 6 (June 1979), pp. 1041–63. For a particular depth point, therefore, which is at a particular value of time $t_x$, the product $A_a(t_x)B_a^*(t_x)$ (referred to simply as AB*, or sometimes merely as AB) may thus be calculated. It has been found that this indicator is useful in distinguishing the presence of Class 3 sands (i.e., sands with relatively low acoustic impedance), which are typically at shallow depths. In addition, since the product indicator AB* uses the complex conjugate of the analytical trace for the AVO slope, the amplitude of this indicator is substantially phase independent.

Alternatively, one may merely consider the real input traces A(t), B(t) in generating the conventional indicator function f(A,B)=AB, without generating the analytical traces and thus without obtaining the benefits of phase-independence.

Figure 4:
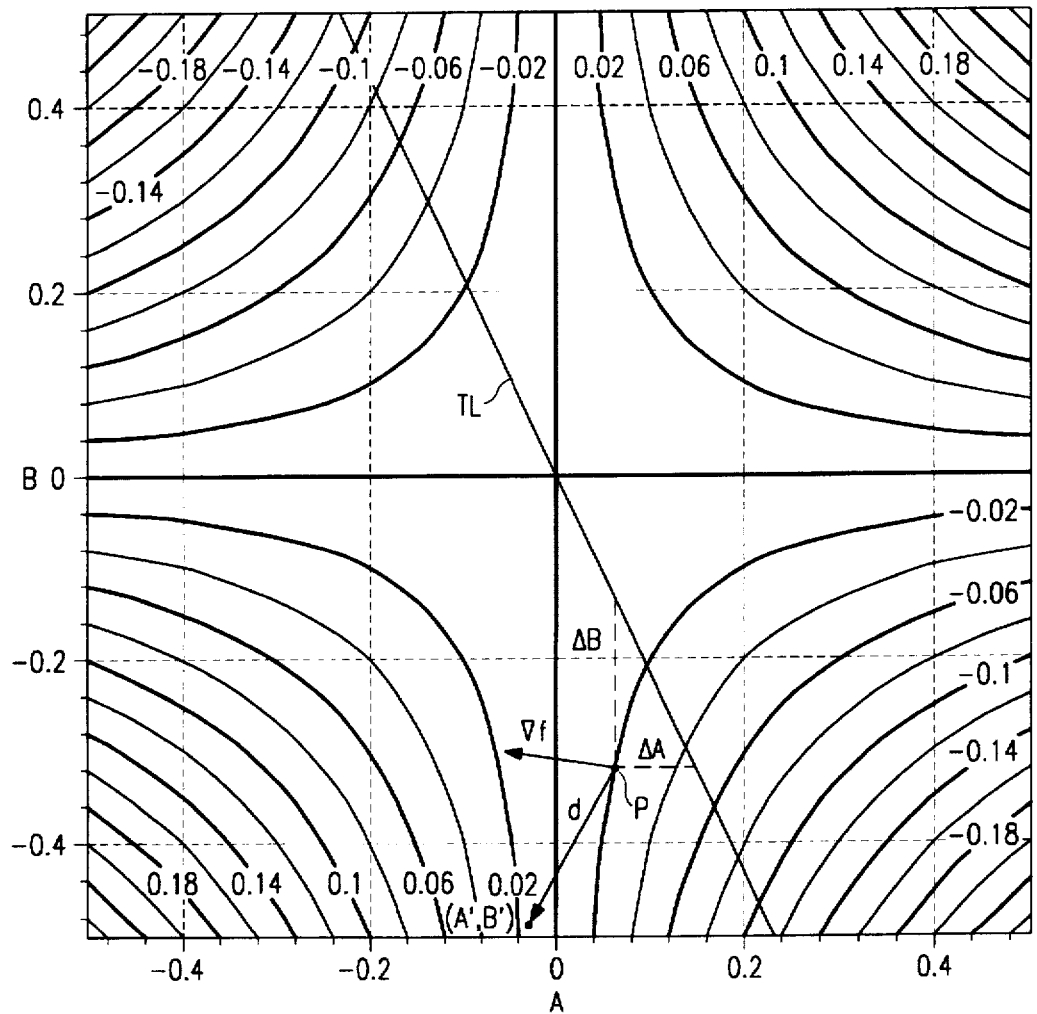
FIG. 4 is a plot, in A—B space, of product AB contours, in conjunction with a shale/wet sand background trend line for an exemplary set of points in a seismic survey, and further showing a specific point that deviates from the trend line.

The product function f(A,B)=AB*, when its real valued function $\Re\{AB^*\}$ is plotted in the (real) A—B plane, and the product function f(A,B)=AB when only real valued A and B traces are used, each represent a saddle surface as shown in FIG. 4, corresponding to the algebraic multiplication of A and B magnitudes. The mathematical gradient of the functions $\Re\{AB^*\}$ and AB will, in each case, be a vector that is perpendicular to the level curves, or contours, at any given point. For purposes of clarity of explanation of the theory of the present invention, only real values will be used in this description. As such, the gradient may be expressed as follows:

$$\nabla f(A,B) = \left( \frac{\partial f}{\partial A}, \frac{\partial f}{\partial B} \right) = (B,A)$$

A sample of neighboring (in time and space) points from the survey may be plotted on this saddle surface, according to their respective values of A and B. Based upon this plotting, one may readily develop a background trend line for the plotted points. Typically, this background trend line will be a line with negative slope in A—B space, since the values of A and B commonly are negatively correlated. FIG. 4 illustrates an exemplary background trend line TL in the plot of A—B space including the contour curves for the indicator function f(A, B).

It has been observed that those points in the survey having A, B values that significantly deviate from the background trend may potentially correspond to interfaces with hydrocarbon-bearing formations. Point P in FIG. 4 is a point in the A—B plane having coordinates (A, B). In this example, the values A, B significantly deviate from the background trend line TL, by the amounts shown as ΔA, ΔB, respectively. According to the preferred embodiment of the invention, one may derive a deviation vector d for any point in the A—B plane, as follows:

$$d = (\Delta A, \Delta B)$$

This vector d simultaneously expresses the magnitude and direction of the deviation from the background trend line TL of any point; FIG. 4 illustrates the deviation vector d for point P. In the case of point P by way of example, the vector d defines a new point (A', B') in the A—B plane, defined as follows:

$$(A', B') = (A + \Delta A, B + \Delta B)$$

The value of the indicator f(A,B) at point P is, as defined above, the value AB. The value of the indicator f(A,B) at the new point (A', B') defined by the deviation vector d may be derived by way of first order Taylor series expansion as follows:

$$f(A+\Delta A, B+\Delta B) = f(A,B) + \Delta f(A,B) \cdot d$$

The second term in this expansion is the dot product of the deviation vector d at point P with the gradient of the indicator function f(A, B) at point P. The deviation and gradient vectors are shown in FIG. 4 for point P. Generally, this dot product may be expressed for any point in the A—B plane as follows:

$$\Delta f(A,B) \cdot d = (B,A) \cdot (\Delta A, \Delta B) = A \Delta B + B \Delta A$$

based on the above definition of the gradient and deviation vectors. According to the preferred embodiment of the invention, a new indicator Δ(AB) is now defined as this dot product term which, as noted above, is the difference of the function f(A,B) evaluated at the end of the deviation vector d and the function f(A,B) at the original point in the A—B plane (e.g., point P), in the direction of the deviation vector d. Expressed in another way, the new indicator Δ(AB) is the rate of change of the function f(A,B) at a particular point in the real A—B plane corresponding to a point in CMP-time space, taken along the direction of the deviation vector d. This indicator thus measures the vertical difference between the two points (i.e., the original point and the point at the end of the deviation vector) along the saddle surface defined by the product of the A and B coefficient values.

This new indicator has several properties that are important when applied to seismic surveys, as will be described hereinbelow. Firstly, the indicator Δ(AB) considers deviations from the background trend for both the AVO intercept value A and the AVO slope value B. In addition, the indicator Δ(AB) is phase independent, since it utilizes the complex conjugate of the AVO slope in its product steps. As will be described in detail hereinbelow, when complex, or analytical, traces are used for the A and B coefficients, the indicator Δ(AB) becomes a complex indicator Δ(AB*) that may be computed as the sum of the products AAB* and B*AA, each of which are substantially phase independent, the indicator itself is phase independent. This new complex indicator Δ(AB*) will thus not be affected by a phase rotation of the source seismic data, and thus will be more robust in its application to actual seismic data.

Figure 5:
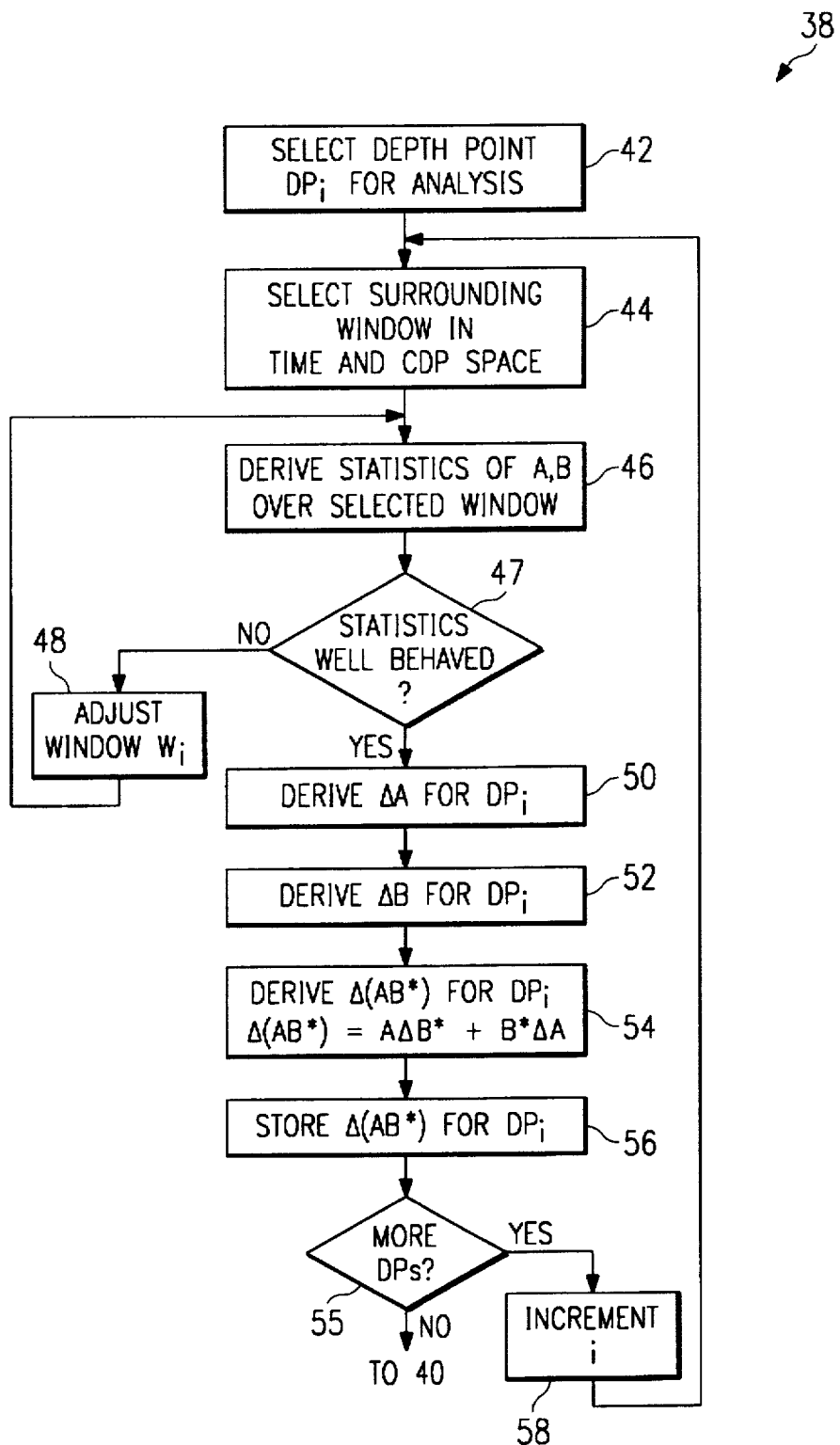
FIG. 5 is a flow chart illustrating the process of deriving the AVO indicator $\Delta(AB^*)$ according to the preferred embodiment of the invention.

With this theoretical background in mind, attention is now directed to FIG. 5 relative to which a method of performing indicator derivation process 38 according to the preferred embodiment of the invention will now be described in detail. Process 38, as in the case of the entire method described herein, is performed by system computer 30 according to a stored computer program. According to the preferred embodiment of the invention, the desired product indicator is the complex indicator Δ(AB*), in order that phase-independence may be obtained; as such, the analytical traces for the AVO intercept value A and AVO gradient value B will be used.

Figure 6:
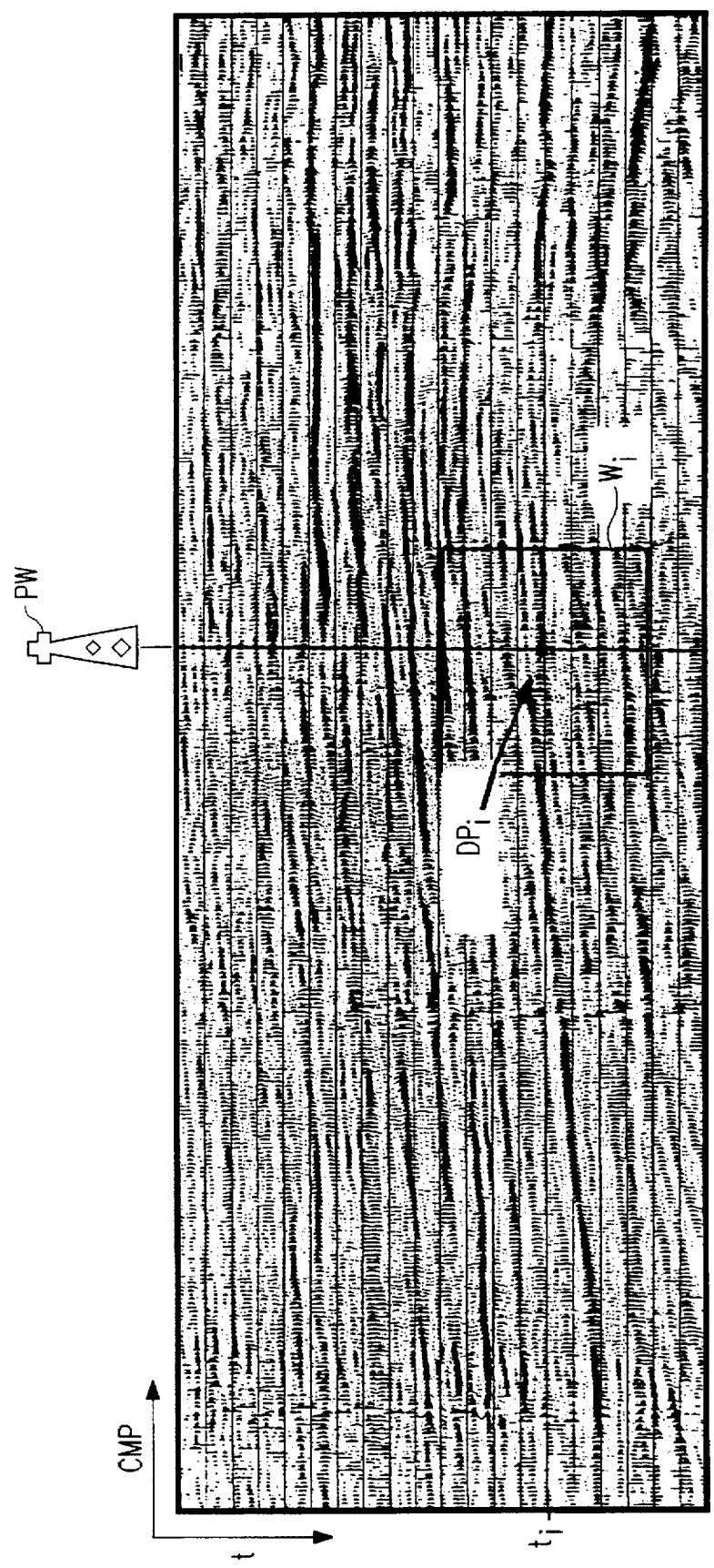
FIG. 6 is an exemplary seismic survey section illustrating the selection of a window for use in the method of FIG. 5.

Process 38 begins, in process 42, with the selection of a first depth point $DP_i$ for which the indicator Δ(AB*) will be determined. As will be evident from the following description, each of the depth points in the survey will be similarly analyzed, such that survey sections of the indicator values for each point in CMP-time space may be plotted. Once depth point $DP_i$ has been selected, a window $W_i$ that surrounds depth point $DP_i$ is selected in process 44. FIG. 6 illustrates an exemplary depth point $DP_i$ in CMP-time space that has been selected in process 42; in this example, depth point $DP_i$ corresponds to time $t_i$ underlying a surface location (i.e., a point along the CMP axis) corresponding to potential well PW. In FIG. 6, depth point $DP_i$ is surrounded by an exemplary associated window $W_i$ selected in process 44. This window $W_i$ extends for a desired distance on both sides of potential well location PW along the CMP axis, and extends for a desired delay time on both sides of time $t_i$ along the time axis. Selection of the desired size of window $W_i$ will be described in further detail hereinbelow.

Process 46 is next performed by way of which the statistics of the AVO intercept value A and AVO slope value B for each depth point within window $W_i$ are derived by system computer 30, for purposes of evaluating whether window $W_i$ is properly selected. In process 46, system computer 30 retrieves the A and B values for each depth point in window $W_i$. Based upon these retrieved values, system computer 30 derives certain statistics corresponding to the correlation and spread of the depth points of window $W_i$ in A—B space.

An example of the determination of such statistics for a group of points in A—B space is described in U.S. Pat. No. 5,515,335. According to this approach, system computer 30 determines, in process 46, several important statistical characteristics of the values of A and B for each depth point in window $W_i$, including the root-mean square (RMS) amplitudes $\sigma_a$, $\sigma_b$, respectively, and also the correlation coefficient r over the window $W_i$. These calculations are made using the complex, or analytical, form of traces A(t), B(t) for each surface location, generated as the sum of real traces for the A and B values over time (i.e., A(t), B(t), respectively) and the square root of −1 times their respective Hilbert transform. The RMS amplitudes $\sigma_a$, $\sigma_b$ are derived, in process 46, according to the following equations:

$$\sigma_a = \frac{\sqrt{\sum_k w_k |A_k|^2}}{\sum_k w_k}$$

$$\sigma_b = \frac{\sqrt{\sum_k w_k |B_k|^2}}{\sum_k w_k}$$

where the index k refers to the $k^{th}$ depth point within window $W_i$, where $|A_k|$ and $|B_k|$ are the magnitudes of the coefficients at the $k^{th}$ depth point, and where wk is a weighting factor for the $k^{th}$ sample within window $W_i$ determined by:

$$w_k = [|A_k|^2 + |B_k|^2]^{-Q}$$

Q is a weighting exponent which governs the relative contribution, to the data statistics, of strong and weak seismic reflectors. While, in the preferred embodiment of the present invention, the preferred value of Q is ½, different geological conditions may dictate other values of this weighting exponent Q. System computer 30 also determines a correlation coefficient r in process 46, according to the following relationship:

$$r = \frac{1}{\sigma_a \sigma_b} \frac{\sum_k W_k A_k B_k^*}{\sum_k W_k}$$

where, as before, $B_k^*$ is the value of the complex conjugate of the AVO slope B at the $k^{th}$ depth point in window $W_i$.

Upon completion of process 46 in which the statistics are derived for the points within window $W_i$, decision 47 is performed by system computer 30 to determine if the statistics calculated in process 46 are sufficiently well-behaved that use of window $W_i$ will provide an accurate result. For example, as noted above, the values of the A and B coefficients are typically negatively correlated with one another; as such, the value r determined in process 46 should be a negative number close to −1. In addition, the values of $\sigma_a$, $\sigma_b$ are analyzed in decision 47 to ensure that the points in A—B space are not too scattered. Qualitatively, decision 47 determines whether window $W_i$ is of the right size. If, for example, window $W_i$ is too large, there may be no clear trend of the A and B values from which deviations may be discerned; conversely, if window $W_i$ is too small, depth points having significant deviations will not be visible (as such deviations will in fact become the trend background). By way of another example, if the value of correlation coefficient r is near zero, but the RMS deviations $\sigma_a$, $\sigma_b$ are approximately of equal magnitude, the choice of trend line will be quite arbitrary. If the statistics of window $W_i$ are not sufficiently well-behaved, process 48 is performed by way of which window $W_i$ is adjusted to be smaller or larger, depending upon the nature of the statistics calculated in the last pass of process 46. Statistical calculation process 46 is then repeated for the adjusted window $W_i$, until the statistical values provide an indication of reliable results.

Figure 7A:
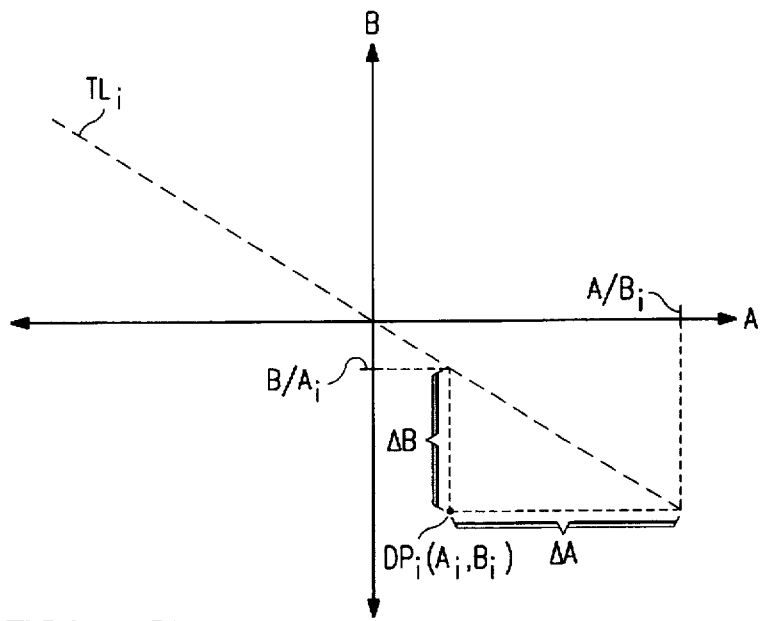
FIGS. 7a and 7b are plots, in A—B space, illustrating alternative methods for deriving the indicator $\Delta(AB^*)$ according to the preferred embodiment of the invention.

Once decision 47 determines that window $W_i$ selected in process 44 (or adjusted in process 48) is appropriate, process 50 is next performed by system computer 30 for depth point $DP_i$ to determine its value of AVO intercept deviation AA from the background trend. FIG. 7a illustrates a first method by way of which processes 50, 52, 54 may be performed. As shown in FIG. 7a, depth point $DP_i$ has A and B values ($A_i$, $B_i$), each of which deviate to a significant extent from trend line $TL_i$, (in the following description, the value $B_i$ corresponds to the complex conjugate of the value of the AVO slope for point $DP_i$). In process 50 according to this approach, system computer 30 determines the value of AA by considering the value $B_i$ of the AVO slope for depth point $DP_i$, and by then determining the value of A for this value $B_i$ for a hypothetical point lying on trend line $TL_i$; this determined value of A is shown in FIG. 7a as $A|B_i$ (or "the value of A given $B_i$"). The value of $\Delta A_i$ determined for point $DP_i$ in process 50 is thus calculated as the difference $A_i - A|B_i$ in which, in this case, will be a negative number. Alternatively, of course, if c is the slope of trend line $TL_i$, one may derive the value $\Delta A_i$ from the equation of the line as follows:

$$\Delta A_i = A_i - A|B_i = A_i - \frac{B_i}{c}$$

According to this embodiment of the invention, the value of $\Delta B_i$ for point $DP_i$ is similarly derived in process 52. Again, system computer 30 determines the value of the AVO slope B for a point on trend line $TL_i$ having an AVO intercept of $A_i$. This value of AVO slope is referred to herein as $B|A_i$ (or "the value of B given $A_i$"). The deviation value $\Delta B_i$ for point $DP_i$ is thus calculated, in process 52, as the difference $B_i - B|A_i$, or by way of the equation of the line for trend line $TL_i$, as follows:

$$\Delta B_i = B_i - B|A_i = B_i - cA_i$$

Once the values of $\Delta A_i$ and $\Delta B_i$ have been calculated by system computer 30 in processes 50, 52, system computer 30 next performs process 54 to derive the indicator $\Delta(AB^*)$ for the current depth point $DP_i$, using the values of $\Delta A_i$, $\Delta B_i$ determined in processes 50,52. According to this first alternative approach, the indicator may be derived by the definition of indicator $\Delta(AB^*)$ given above, as follows:

$$\Delta(AB^*) = A \Delta B^* + B^* \Delta A$$

or, when applied for point $DP_i$ using the values of $\Delta A_i$, $\Delta B_i$, as follows:

$$\Delta(AB^*) = A_i \Delta B_i + \Delta A_i$$

Alternatively, if only real-valued traces for AVO intercept value A and AVO gradient value B are used (i.e., analytical traces for A and B are not generated), and if one wished to ignore the scatter of points in the A—B plane (i.e., by effectively setting the correlation coefficient to −1), the expression for real-valued indicator $\Delta(AB)$ may be reduced to using merely the slope c from the equation of trend line $TL_i$, as follows:

$$\Delta(AB) = -\frac{1}{c} |B_i - cA_i|^2$$

According to this approach, the benefit of phase-independence will not be obtained, nor will the effects of scatter be comprehended, but of course the computing requirements for generation of the indicator will be reduced.

Figure 7B:
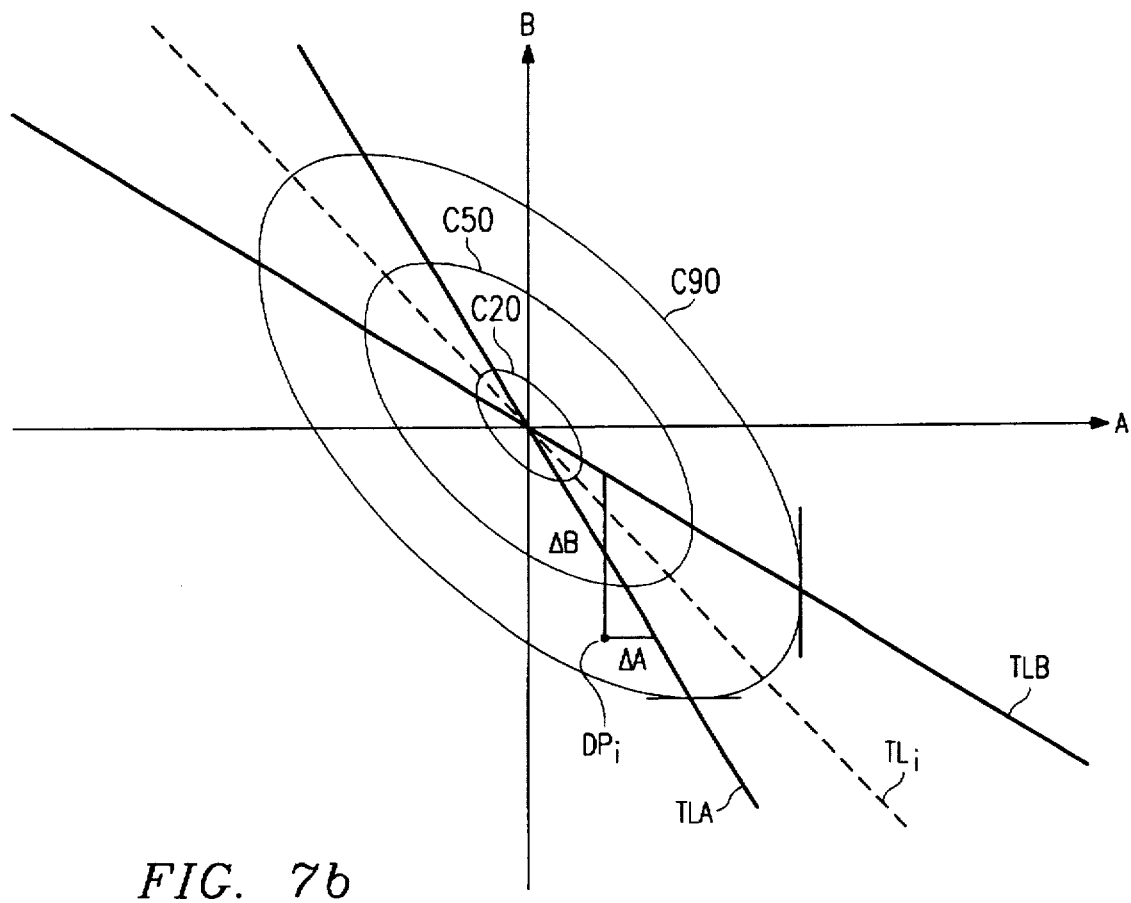

Referring now to FIG. 7b, an alternative approach for deriving the indicator $\Delta(AB^*)$ for a depth point $DP_i$ using processes 50, 52, 54 will now be described in detail. This alternative considers the statistics r, $\sigma_a$, $\sigma_b$ that have already been derived for window $W_i$ in process 46 in determining a statistically adjusted value of the deviation of the A and B coefficients for depth point $DP_i$ from the background trend, and will utilize the analytical traces for AVO intercept value A and AVO gradient value B to provide a phase-independent result.

FIG. 7b shows a series of concentric elliptical contours C90, C50, C20 in the A—B plane, illustrating the statistical scatter of the A and B values for the points in window $W_i$ in this example. Contours C90, C50, C20 contain the loci of 90%, 50%, and 20% of the points in A—B space from window $W_i$, respectively. As is evident from the elliptical shape and spacing of contours C90, C50, C20, each of the values of A and B in this example form a jointly Gaussian distribution; this behavior of A and B values within a properly defined window $W_i$ is typical for actual surveys. Trend line $TL_i$ is illustrated as before and, of course, is in the same location in FIG. 7b as in FIG. 7a, considering that the exemplary window $W_i$ is the same.

According to this alternative approach, the statistics r, $\sigma_a$, $\sigma_b$ are used to determine new trend lines TLA, TLB for depth point $DP_i$. Trend line TLA corresponds to a line in A—B space at which the most likely values of A will reside given a value of B, considering the statistical scatter of the A and B values. Trend line TLA specifically corresponds to a line that passes through the horizontal (constant A) tangent points of the elliptical contours., as is evident from the intersections between line TLA and contours C90, C50, etc. in FIG. 7b. Similarly, trend line TLB is a line which provides the most likely estimate of B for given values of A, and as such is a line that intersects the vertical (constant B) tangents of the elliptical contours.

Referring back to FIG. 5, according to this alternative approach, the deviation value $\Delta A_i$ for depth point $DP_i$ may be determined in process 50 from the statistics r, $\sigma_a$, $\sigma_b$ as follows:

$$\Delta A_i = A_i - r \frac{\sigma_a}{\sigma_b} B_i$$

Similarly, process 52 may be performed by system computer 30 to determine the deviation value $\Delta B_i$ for depth point $DP_i$ from the following relationship:

$$\Delta B_i = B_i - r^* \frac{\sigma_b}{\sigma_a} A_i$$

where $r^*$ is the complex conjugate of the correlation coefficient r. One of ordinary skill in the art will appreciate that these relationships for deriving the deviation values corresponds to the definition of the gradient function set forth above.

Upon calculating the deviation values $\Delta A_i$, $\Delta B_i$ in processes 50, 52 according to this alternative approach, process 54 may now be performed by system computer 30 to derive the value of indicator $\Delta(AB^*)$ by the sum of the products:

$$\Delta(AB^*) = A_i \Delta B^*_i + B^*_i \Delta A_i$$

Alternatively, one may combine the operations of processes 50, 52, 54 to directly derive the value of indicator $\Delta(AB^*)$, according to this statistical approach, according to the following equation:

$$\Delta(AB^*) = 2A_i B_i^* - r \frac{\sigma_b}{\sigma_a} |A_i|^2 - r \frac{\sigma_a}{\sigma_b} |B_i|^2$$

This direct calculation may be readily derived from the foregoing description. In either case, the use of the statistics r, $\sigma_a$, $\sigma_b$ in the determination of indicator $\Delta(AB^*)$ has been observed to provide improved accuracy in the determination of the indicator, along with improved sensitivity. Furthermore, use of the statistics r, $\sigma_a$, $\sigma_b$ in determining the indicator provides improved visibility when the indicator $\Delta(AB^*)$ is plotted using conventional seismic survey techniques (where positive amplitudes are filled), as points with positive values of the indicator $\Delta(AB^*)$ indicate actual deviations from the background trend, while points with negative and zero values of the indicator $\Delta(AB^*)$ are within the statistical background and thus do not correspond to a hydrocarbon-bearing formation.

Referring back to FIG. 5, once process 54 has been completed for depth point $DP_i$, system computer 30 then stores the corresponding indicator $\Delta(AB^*)$ into memory, either random access memory within system computer 30 or disk storage 29. Decision 55 is then performed by system computer 30 to determine if additional depth points remain in the survey for which values of indicator $\Delta(AB^*)$ are to be calculated; if so, process 58 increments the index i which points to the current depth point $DP_i$ to point to the next depth point in sequence. Processes 44, 46, et seq. are then repeated for this new depth point, until all are complete (decision 55 returns a NO).

Upon completion of process 38 for all depth points in the survey, control passes to process 40 (FIG. 3) by way of which an output survey section of indicator $\Delta(AB^*)$ is plotted for use by the human analyst. Typically, only the real part of indicator $\Delta(AB^*)$ is plotted and used by the analyst.

The plots of the indicator $\Re\{\Delta(AB^*)\}$ typically resemble a plot of seismic traces, with each trace corresponding to a surface location and having a varying amplitude as a function of time (i.e., depth into the earth).

Figure 8:
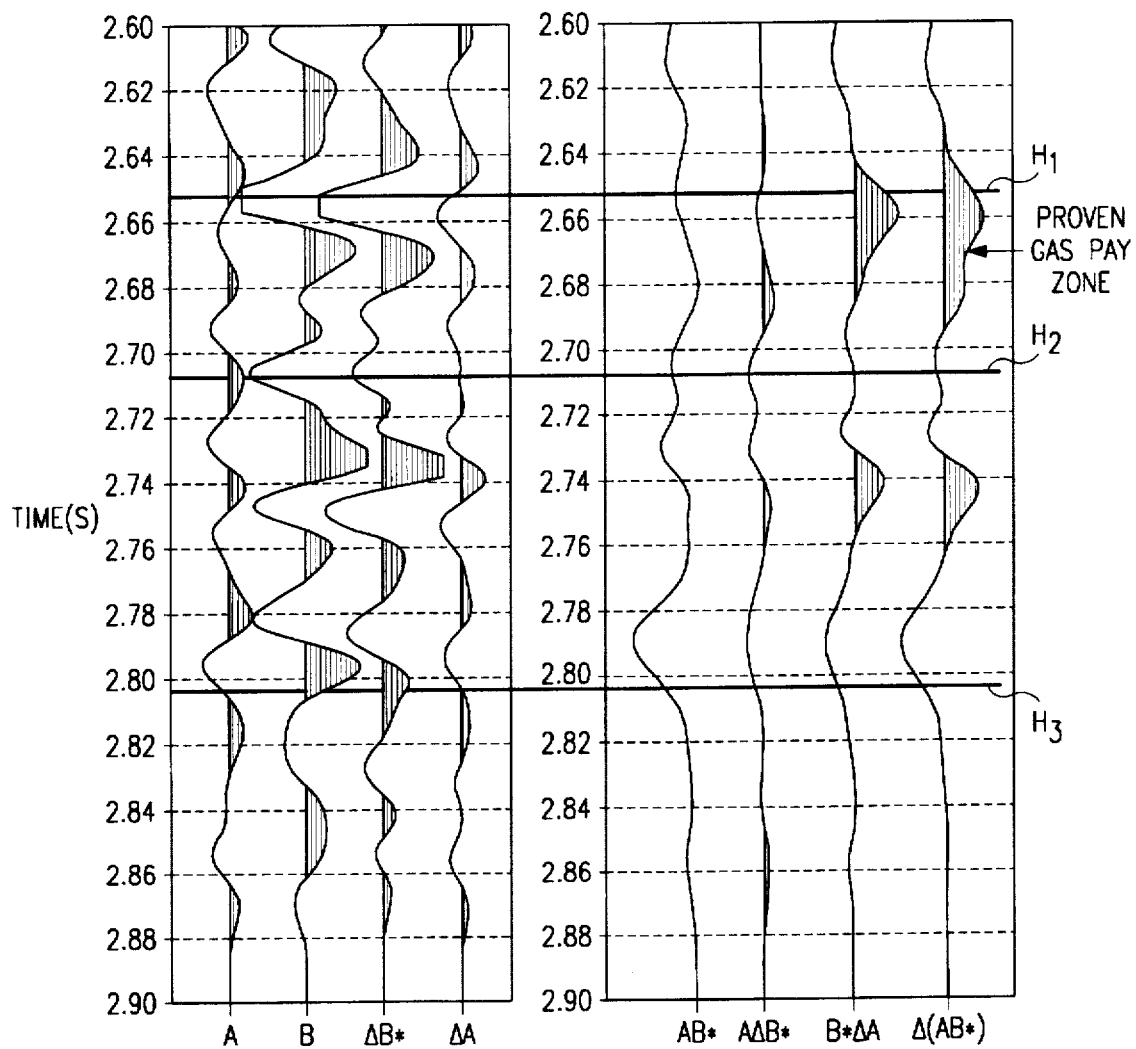
FIG. 8 is a series of traces illustrating a comparison between conventional AVO coefficients and indicators and the indicator $\Delta(AB^*)$ derived according to the preferred embodiment of the invention.

Referring now to FIG. 8, a comparative example of a portion of a trace of indicator $\Re\{\Delta(AB^*)\}$ for a particular surface location generated from actual well log data is shown, along with corresponding portions of traces of the AVO coefficients A and B and the conventional product AB indicator at this same location, will be described. Each of the traces in FIG. 8 are, of course, the real component of their corresponding function. As shown in FIG. 8, each of the AVO traces span the same time interval which, in this example, is from 2.60 seconds to 2.90 seconds delay time (after NMO correction). Each of the traces shown in FIG. 8 are formed at various stages of the process of FIG. 3 according to this preferred embodiment of the invention, depending upon their particular value or indicator.

As shown in FIG. 8, the values of A and B are plotted over time, each varying positively and negatively over time. Since the AVO intercept value A corresponds substantially to an arithmetic stack of traces of common depth point, each of the positive excursions of the value A over time indicate a potential reflection event. For example, a potential reflection horizon H1 exists at a time of approximately 2.65 seconds; in this example, this potential horizon H1 has been verified by drilling as corresponding to the top of a Class 1 sand formation, defined as a sand that has an acoustic impedance greater than that of a surrounding shale, and typically found relatively deep in the earth. As indicated in FIG. 8, the area immediately below horizon H1 has been verified, by drilling, as corresponding to a proven gas pay zone. At horizon H1, the value of AVO intercept A is positive while the value of AVO slope B is strongly negative, consistent with typical Class 1 sands.

FIG. 8 illustrates, on the right hand side, the conventional product indicator AB* over this same range of time. As evident from FIG. 8, this conventional product indicator is substantially flat at and later than the time corresponding to horizon H1. In contrast, indicator Δ(AB*) generated according to this embodiment of the invention, as shown in FIG. 8, is strongly positive at horizon H1, for a period of about 0.05 seconds. Accordingly, indicator Δ(AB*) clearly provides a strong indication of the presence of a gas-bearing formation at a location where the conventional indicator AB* does not.

Figure 9A:
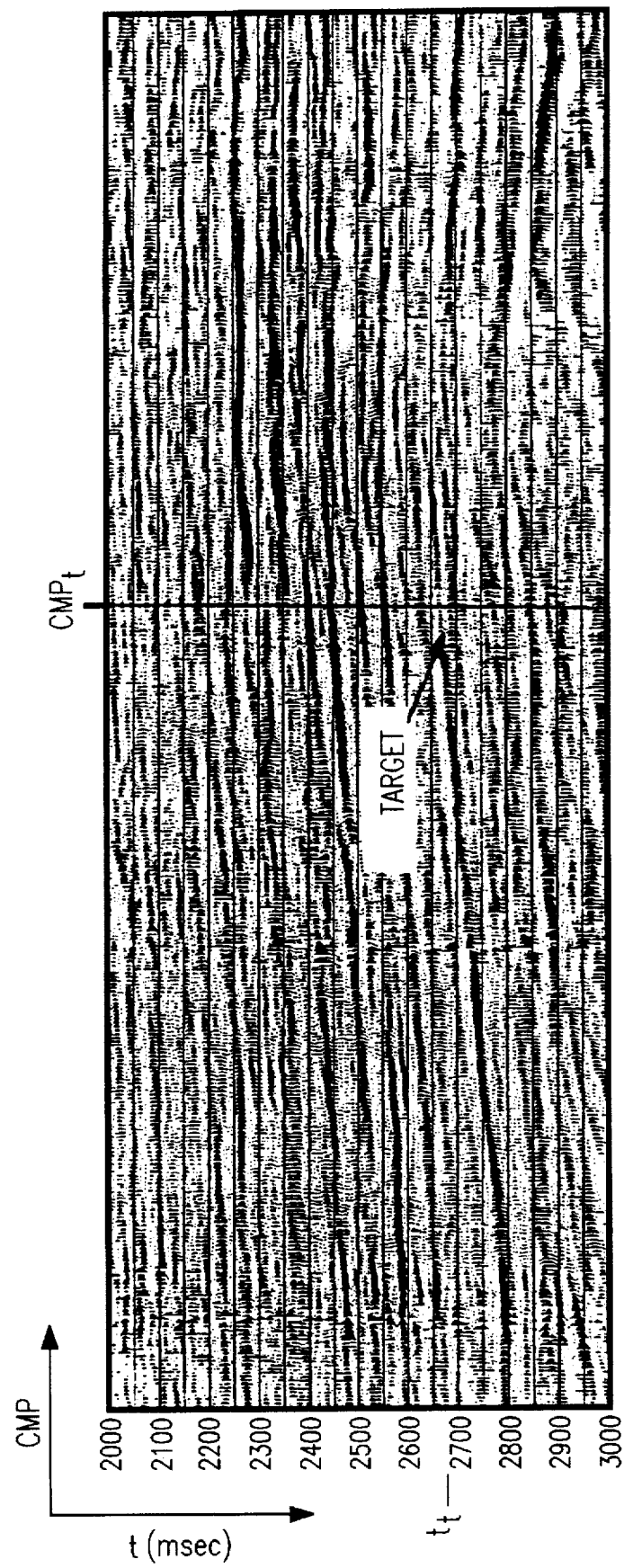
FIGS. 9a through 9c are seismic survey sections of a shot line in a seismic survey, for comparing the stack survey, a conventional AVO indicator, and the indicator $\Delta(AB^*)$ derived according to the preferred embodiment of the invention.
Figure 9B:
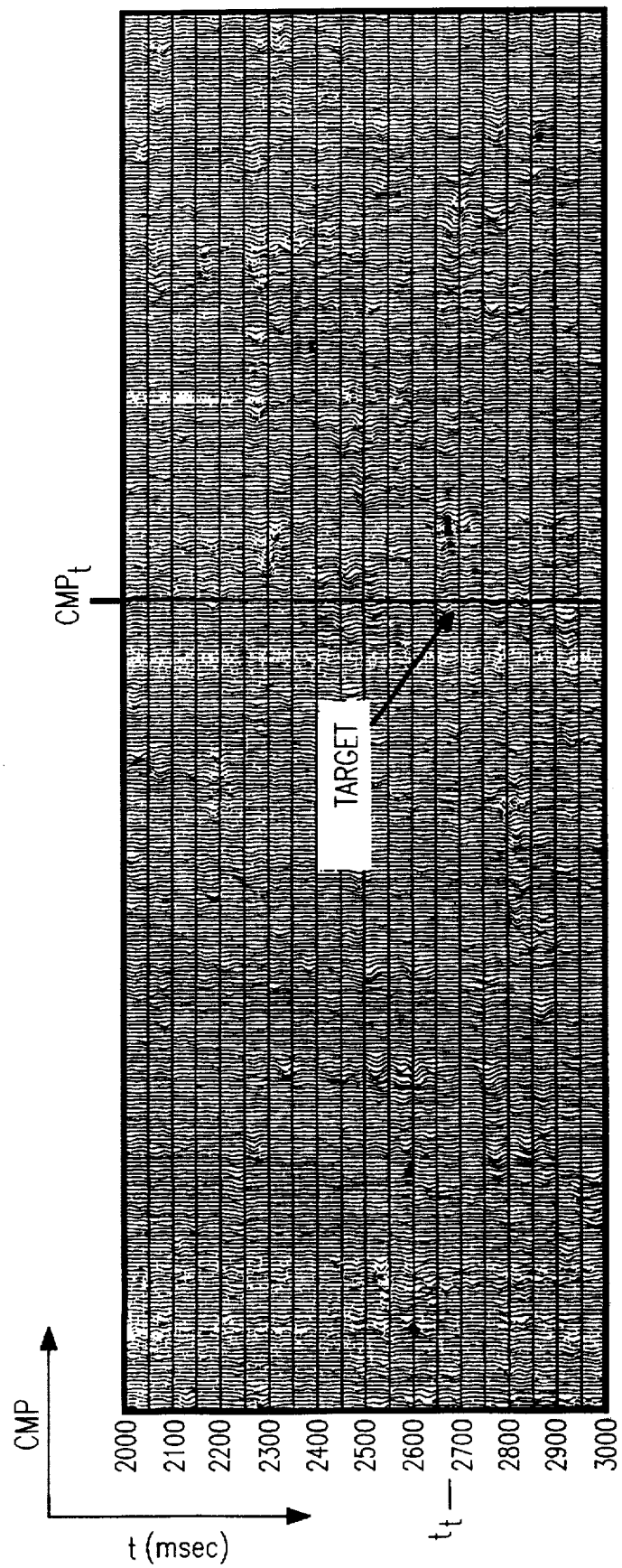
Figure 9C:
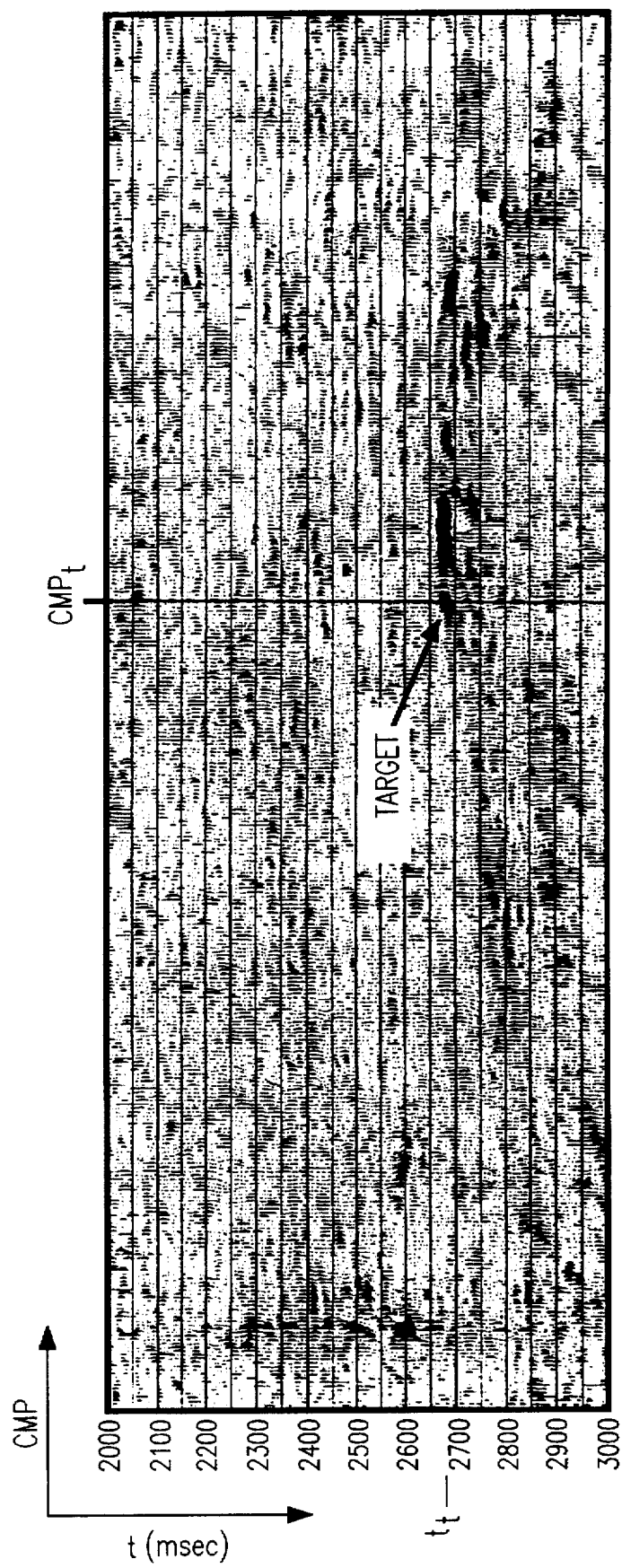

As noted above, process 40 typically plots survey sections of the indicator Δ(AB*) as series of traces over time (similar to the portions shown in FIG. 8), each trace associated with a surface location (i.e., a point along the CMP axis in CMP-time space) in the survey area. These survey sections provide the human analyst with a visual indication of the indicator, readily allowing discernment of the potential hydrocarbon bearing formations therefrom. FIGS. 9a through 9c illustrate an example of such survey sections as taken from an actual shot line in a conventional seismic survey that crosses the well location corresponding to the traces in FIG. 8.

FIG. 9a is a conventional seismic survey section of traces, each corresponding to a time-domain stack for a particular surface location. A target location ("target") is indicated in FIG. 9a as pointing to a location in CMP-time space corresponding to a drilling location CMP$_r$, at time t$_r$; this location will be a reference point in CMP-time space used in the comparison of the indicators to be described. As is evident from FIG. 9a, no particular strong event is evident at the target location from the simple stack of the CDP gathers.

FIG. 9b is a survey section, in CMP-time space, of the conventional product indicator $\Re e\{AB^*\}$ derived from the seismic data represented in the section of FIG. 9a. As evident from FIG. 9b, no strong event is indicated at the target location (underlying surface location CMPT at time t$_r$). It should be noted that the depth represented by time t$_r$ is relatively deep in the earth, and is at a depth at which Class 3 sands may be encountered.

FIG. 9c is a survey section, also in CMP-time space, of the real portion of the indicator Δ(AB*), or $\Re e\{\Delta(AB^*)\}$, that is derived from the seismic data represented in FIG. 9a according to the preferred embodiment of the invention described hereinabove.. As is evident from FIG. 9c, this indicator shows a strong event at the target location (underlying surface location CMP$_r$ at time t$_r$), specifically at a location where the conventional product indicator AB* showed no activity. This strong indication provided by the indicator Δ(AB*) matched an actual gas-bearing formation. This example shows that the indicator Δ(AB*) according to the preferred embodiment of the invention is capable of discerning gas-bearing formations from seismic data that are not discernible by conventional indicators.

It has been observed, in connection with the present invention, that the indicator Δ(AB*) is able to detect the presence of Class 2 and Class 3 hydrocarbon-bearing formations that are undetectable by conventional AVO indicators. Further, it has been observed that the indicator Δ(AB*) is also useful as a check against strong events of conventional AVO indicators; for example, horizons that manifest a strong positive amplitude of the conventional product indicator AB* but that do not have a positive amplitude for the new indicator Δ(AB*) have been verified, by drilling, to be water-bearing formations. Accordingly, the new indicator Δ(AB*) not only provides an indication of a fluid bearing formation, but also indicates whether the fluid is water or gas.

The present invention thus provides important advantages in the field of seismic prospecting for oil and gas reserves, particularly in discerning reservoirs relatively deep into the earth, for which conventional indicators are not useful. The present invention provides such indicators in a manner that is substantially phase-independent, thus providing further signal-noise margin. Actual verification of the presence of bas-bearing formations indicated by the present invention has been made.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A method of operating a computer to analyze seismic survey signals to distinguish the presence of hydrocarbon-bearing formations in a region of the earth corresponding to the seismic survey signals, wherein the seismic survey signals comprise a plurality of series of time-based signals obtained at a plurality of detectors at the earth responsive to seismic energy imparted to the earth, the signals being gathered into gathers of seismic survey signals, each gather representative of energy reflected from depth points below a corresponding one of a plurality of surface locations at a plurality of angles of incidence, the method comprising the steps of:

retrieving, from a memory, digital data corresponding to a plurality of gathers;

determining, for each depth point represented by each of the gathers, an AVO intercept value and an AVO gradient value;

for each of a plurality of analysis depth points, operating the computer to perform the steps of:

selecting a plurality of surrounding depth points that surround, in space and in time, the analysis depth point;

deriving a background trend of the AVO intercept values and AVO gradient values for the plurality of surrounding depth points;

determining an indicator corresponding to the rate of change of the product of the AVO intercept value and the AVO gradient value for the analysis depth point, along the direction of a deviation vector of the AVO intercept value and the AVO gradient value from the background trend; and storing the indicator in memory; and displaying the values of the indicators for the plurality of analysis depth points on an output device.

2. The method of claim 1, wherein the indicator corresponds to the rate of change of the AVO intercept value and the complex conjugate of the AVO gradient value along the direction of a deviation vector of the AVO intercept value and the complex conjugate of the AVO gradient value from the background trend.

3. The method of claim 1, wherein the step of deriving a background trend comprises:

operating the computer to derive a trend line, in a space having the AVO intercept value and the AVO gradient value as axes, from the AVO intercept value and the AVO gradient value for each of the plurality of surrounding depth points.

4. The method of claim 3, wherein the step of determining an indicator comprises:

determining an AVO intercept deviation corresponding to the difference of the AVO intercept value of the analysis depth point and the AVO intercept value at the trend line for the same AVO gradient value as that of the analysis depth point;

determining an AVO gradient deviation corresponding to the difference of the AVO gradient value of the analysis depth point and the AVO gradient value at the trend line for the same AVO intercept value as that of the analysis depth point; and calculating the indicator as the sum of a first product of the AVO intercept deviation and the AVO gradient value for the analysis depth point, and a second product of the AVO gradient deviation and the AVO intercept value of the analysis depth point.

5. The method of claim 1, wherein the step of deriving a background trend comprises:

deriving a set of statistics of the AVO intercept value and the AVO gradient value for each of the plurality of surrounding points, the set of statistics including a measure of th e correlation of the AVO intercept value and the AVO gradient value, and including measures of deviations of the AVO intercept value and the AVO gradient value.

6. The method of claim 5, further comprising:

after the step of deriving a set of statistics, again selecting a plurality of surrounding depth points, adjusted responsive to the values of the statistics in the set of statistics.

7. The method of claim 5, wherein the step of determining an indicator comprises:

determining an AVO intercept deviation corresponding to the difference of the AVO intercept value of the analysis depth point and a most likely value of the AVO intercept value for the analysis depth point based upon the set of statistics;

determining an AVO gradient deviation corresponding to the difference of the AVO gradient value of the analysis depth point and a most likely value of the AVO intercept value for the analysis depth point based upon the set of statistics and calculating the indicator as the sum of a first product of the AVO intercept deviation and the AVO gradient value for the analysis depth point, and a second product of the AVO gradient deviation and the AVO intercept value of the analysis depth point.

8. The method of claim 1, wherein the displaying step comprises:

plotting the indicator for each depth point at a corresponding location in a seismic survey section.

9. A computer-readable memory having a storage medium configured so that, when read and used by a computer, the computer is directed to analyze seismic survey signals comprising a plurality of series of time-based signals obtained at a plurality of detectors at the earth responsive to seismic energy imparted to the earth and gathered into gathers of seismic survey signals, each gather representative of energy reflected from depth points below a corresponding one of a plurality of surface locations at a plurality of angles of incidence, said computer directed by a plurality of operations comprising:

retrieving, from a memory, digital data corresponding to a plurality of gathers;

determining, for each depth point represented by each of the gathers, an AVO intercept value and an AVO gradient value;

for each of a plurality of analysis depth points, operating the computer to perform the steps of:

selecting a plurality of surrounding depth points that surround, in space and in time, the analysis depth point;

deriving a background trend of the AVO intercept values and AVO gradient values for the plurality of surrounding depth points;

determining an indicator corresponding to the rate of change of the product of the AVO intercept value and the AVO gradient value for the analysis depth point, along the direction of a deviation vector of the AVO intercept value and the AVO gradient value from the background trend; and storing the indicator in memory; and displaying the values of the indicators for the plurality of analysis depth points on an output device.

10. The computer-readable memory of claim 9, wherein the indicator corresponds to the rate of change of the AVO intercept value and the complex conjugate of the AVO gradient value along the direction of a deviation vector of the AVO intercept value and the complex conjugate of the AVO gradient value from the background trend.

11. The computer-readable memory of claim 9, wherein the operation of deriving a background trend comprises:

operating the computer to derive a trend line, in a space having the AVO intercept value and the AVO gradient value as axes, from the AVO intercept value and the AVO gradient value for each of the plurality of surrounding depth points.

12. The computer-readable memory of claim 11, wherein the operation of determining an indicator comprises:

determining an AVO intercept deviation corresponding to the difference of the AVO intercept value of the analysis depth point and the AVO intercept value at the trend line for the same AVO gradient value as that of the analysis depth point;

determining an AVO gradient deviation corresponding to the difference of the AVO gradient value of the analysis depth point and the AVO gradient value at the trend line for the same AVO intercept value as that of the analysis depth point; and calculating the indicator as the sum of a first product of the AVO intercept deviation and the AVO gradient value for the analysis depth point, and a second product of the AVO gradient deviation and the AVO intercept value of the analysis depth point.

13. The computer-readable memory of claim 9, wherein the operation of deriving a background trend comprises:

deriving a set of statistics of the AVO intercept value and the AVO gradient value for each of the plurality of surrounding points, the set of statistics including a measure of the correlation of the AVO intercept value and the AVO gradient value, and including measures of deviations of the AVO intercept value and the AVO gradient value.

14. The computer-readable memory of claim 13, wherein the plurality of operations further comprises:

after the operation of deriving a set of statistics, again selecting a plurality of surrounding depth points, adjusted responsive to the values of the statistics in the set of statistics.

15. The computer-readable memory of claim 13, wherein the operation of determining an indicator comprises:

determining an AVO intercept deviation corresponding to the difference of the AVO intercept value of the analysis depth point and a most likely value of the AVO intercept value for the analysis depth point based upon the set of statistics;

determining an AVO gradient deviation corresponding to the difference of the AVO gradient value of the analysis depth point and a most likely value of the AVO intercept value for the analysis depth point based upon the set of statistics; and calculating the indicator as the sum of a first product of the AVO intercept deviation and the AVO gradient value for the analysis depth point, and a second product of the AVO gradient deviation and the AVO intercept value of the analysis depth point.

16. The computer-readable memory of claim 9, wherein the displaying operation comprises:

plotting the indicator for each depth point at a corresponding location in a seismic survey section.

17. A digital computing system for analyzing seismic survey signals to distinguish the presence of hydrocarbon-bearing formations in a region of the earth corresponding to the seismic survey signals, comprising:

a memory for storing data corresponding to a plurality of series of time-based signals obtained at a plurality of detectors at the earth responsive to seismic energy imparted to the earth and gathered into gathers of seismic survey signals, each gather representative of energy reflected from depth points below a corresponding one of a plurality of surface locations at a plurality of angles of incidence;

a graphics display output device; and a programmed computer, coupled to the memory and to the graphics display output device, for:

retrieving, from the memory, digital data corresponding to a plurality of gathers;

determining, for each depth point represented by each of the gathers, an AVO intercept value and an AVO gradient value;

for each of a plurality of analysis depth points, performing the operations of:

selecting a plurality of surrounding depth points that surround, in space and in time, the analysis depth point;

deriving a background trend of the AVO intercept values and AVO gradient values for the plurality of surrounding depth points;

determining an indicator corresponding to the rate of change of the product of the AVO intercept value and the AVO gradient value for the analysis depth point, along the direction of a deviation vector of the AVO intercept value and the AVO gradient value from the background trend;

storing the indicator in the memory; and forwarding, to the graphics display output device, the values of the indicators for the plurality of analysis depth points for display.

18. The system of claim 17, wherein the operation of deriving a background trend comprises:

operating the computer to derive a trend line, in a space having the AVO intercept value and the AVO gradient value as axes, from the AVO intercept value and the AVO gradient value for each of the plurality of surrounding depth points; and wherein the operation of determining an indicator comprises:

determining an AVO intercept deviation corresponding to the difference of the AVO intercept value of the analysis depth point and the AVO intercept value at the trend line for the same AVO gradient value as that of the analysis depth point;

determining an AVO gradient deviation corresponding to the difference of the AVO gradient value of the analysis depth point and the AVO gradient value at the trend line for the same AVO intercept value as that of the analysis depth point; and calculating the indicator as the sum of a first product of the AVO intercept deviation and the AVO gradient value for the analysis depth point, and a second product of the AVO gradient deviation and the AVO intercept value of the analysis depth point.

19. The system of claim 17, wherein the operation of deriving a background trend comprises:

deriving a set of statistics of the AVO intercept value and the AVO gradient value for each of the plurality of surrounding points, the set of statistics including a measure of the correlation of the AVO intercept value and the AVO gradient value, and including measures of deviations of the AVO intercept value and the AVO gradient value;

and wherein the operation of determining an indicator comprises:

determining an AVO intercept deviation corresponding to the difference of the AVO intercept value of the analysis depth point and a most likely value of the AVO intercept value for the analysis depth point based upon the set of statistics;

determining an AVO gradient deviation corresponding to the difference of the AVO gradient value of the analysis depth point and a most likely value of the AVO intercept value for the analysis depth point based upon the set of statistics; and calculating the indicator as the sum of a first product of the AVO intercept deviation and the AVO gradient value for the analysis depth point, and a second product of the AVO gradient deviation and the AVO intercept value of the analysis depth point.

* * * * *